United States Patent
Sundaram et al.

(10) Patent No.: US 7,245,718 B2
(45) Date of Patent: Jul. 17, 2007

(54) LOW BANDWIDTH ZERO KNOWLEDGE AUTHENTICATION PROTOCOL AND DEVICE

(75) Inventors: Ravi Sundaram, Cambridge, MA (US); William S. Yerazunis, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 881 days.

(21) Appl. No.: 10/649,855

(22) Filed: Aug. 26, 2003

(65) Prior Publication Data

US 2005/0058288 A1    Mar. 17, 2005

(51) Int. Cl.
*H04K 1/00* (2006.01)
*H04L 9/00* (2006.01)
*H04L 9/28* (2006.01)

(52) U.S. Cl. .......................... 380/30; 380/28; 713/168
(58) Field of Classification Search ...................... None
See application file for complete search history.

(56) References Cited

U.S. PATENT DOCUMENTS

| | | | |
|---|---|---|---|
| 4,926,479 A * | 5/1990 | Goldwasser et al. ........ 713/180 |
| 4,995,082 A | 2/1991 | Schnorr ....................... 380/23 |
| 5,606,617 A * | 2/1997 | Brands ........................ 380/30 |
| 5,867,578 A * | 2/1999 | Brickell et al. ............. 713/180 |
| 6,076,163 A * | 6/2000 | Hoffstein et al. ........... 713/168 |
| 6,292,897 B1 * | 9/2001 | Gennaro et al. ............ 713/175 |
| 6,411,715 B1 * | 6/2002 | Liskov et al. ............... 380/277 |
| 6,889,322 B1 * | 5/2005 | Levy .......................... 713/168 |
| 6,898,284 B2 * | 5/2005 | Solinas ........................ 380/28 |
| 6,959,085 B1 * | 10/2005 | Hoffstein et al. ............. 380/30 |
| 7,184,547 B1 * | 2/2007 | Girault et al. ................ 380/30 |
| 2004/0064700 A1 * | 4/2004 | Kim et al. .................. 713/170 |

OTHER PUBLICATIONS

Alfred J. Menezes et al., Handbook of Applied Cryptography, 1997, CRC Press LLC, pp. 405-417, 421-424.*
Bruce Schneier, Applied Cryptography Protocols, Algorithms, and Source Code in C, 1996, John Wiley & Sons, Inc., 2nd Edition, pp. 102-111.*

(Continued)

*Primary Examiner*—Kambiz Zand
*Assistant Examiner*—Aubrey H. Wyszynski
(74) *Attorney, Agent, or Firm*—Dirk Brinkman; Clifton D. Mueller; Gene V. Vinokur

(57) ABSTRACT

A method authenticates $d_i$ identities in parallel using two prime numbers p and q such that q|p−1. Each identity includes a private key $s_i$ and a public key $v_i$, and a publicly known generator is $\alpha$ such that $\alpha^q \equiv 1 \pmod{p}$. A verifier is provided with an ordered list of the public keys $v_i$. A prover selects uniformly at random a non-negative number r less than q. A number $x = \alpha^r \pmod{p}$ is sent from the prover to a verifier. The verifier selects uniformly at random a non-negative number e less than $2^{(t+\log d)}$, where log is base 2, and a number t is a predetermined security parameter. The prover receives from the verifier the number e. A number $y = r + \Sigma_i s_i * e^i \pmod{q}$ is generated by the prover, and the number Y is sent to the verifier, who then determines if an equality $x = \alpha^y * \Pi_i(v_i)^{e^i} \pmod{p}$ is true. The prover is accepted as having the $d_i$ identities if and only if the equality is true. In a preferred embodiment the communications between the prover and the verifier is via a low-bandwidth optical channel.

10 Claims, 2 Drawing Sheets

OTHER PUBLICATIONS

Bellare M., and Palacio A., "GQ and Schnorr identification schemes: proofs of security against impersonation under active and concurrent attacks," Advances in Cryptology-CRYPTO '02, (2002).

Dietz, P., Yerazunis W., and Leigh, D., "*Very low-cost sensing and communication using bidirectional LEDs*," Jul. 2003.

Burmester M., "*A remark on the efficiency of identification schemes*," EUROCRYPT '90, pp. 493-495 (1990).

Cramer R., Damgard I., and MacKenzie P.D., "*Efficient zero knowledge proofs of knowledge without intractability assumptions*," Public Key Cryptography '00, pp. 354-372 (2002).

Schnorr C. P., "*Efficient signature generation for smart cards*," Journal of Cryptology, vol. 4, No. 3, pp. 161-174 (1991).

Cramer R., and Shoup V., "A practical public key cryptosystem provably secure against adaptive chosen ciphertext attack," Advances in Cryptology-CRYPTO '98, pp. 13-25 (1998).

Guillou L. C., and Quisquater J. -J., "A practical zero knowledge protocol fitted to security microprocessor minimizing both transmission and memory," EUROCRYPT '88, pp. 123-128 (1988).

Guillou L. C., and Ugon M., "*Smart card: a highly reliable and portable security device*," Advances in Cryptology-CRYPTO '86.

LaMacchia B. A., and Odlyzko A. M., "*Computation of discrete logarithms in prime fields*," Designs, Codes and Cryptography, vol. 1, pp. 46-62 (1991).

Morris R., and Thompson K., "*Password security: a case history*," Communications of the ACM, vol. 22, pp. 594-597 (1979).

Quisquater J. -J., Guillou L., and Berson T., "*How to explain zero knowledge protocols to your children*," Advances in Cryptology-CRYPTO '89, LNCS 435, pp. 628-631 (1989).

\* cited by examiner

200

LOW BANDWIDTH ZERO KNOWLEDGE AUTHENTICATION PROTOCOL AND DEVICE

FIELD OF THE INVENTION

The invention relates generally to authentication protocols, and more particularly to zero knowledge authentication protocols.

BACKGROUND OF THE INVENTION

Rustication

Authentication is a process by which a prover assures a verifier that the prover has a claimed identity. A thorough description is provided by Menezes et al., "Handbook of applied cryptography," CRC Press, 1997, and Schneier "Applied cryptography," Wiley, 1996.

Two primary objectives of the authentication protocol are completeness and soundness. Completeness means that the prover can always complete the authentication. Soundness means that an imposter has a negligible probability of completing the authentication.

There are various grades of dishonesty and corresponding levels of security. In a conventional security framework, it is assumed that the imposter can make multiple attacks on the prover, Feige et al., "Zero knowledge proofs of identity," Journal of Cryptology, Vol. 1, pp. 77-94, 1988.

A typical requirement of the authentication protocol is that the protocol is secure against impersonation under passive attack, where an adversarial prover has access to transcripts of prover-verifier interactions. A stronger requirement is that the protocol is secure against active attacks. Here, an adversarial prover can actively play the role of a cheating verifier with the prover numerous times before the impersonation attempt.

It is also desired to secure against concurrent attacks. In these attacks, an adversarial prover plays the role of a cheating verifier prior to impersonation. A key distinction is that the imposter interacts concurrently with multiple honest provers.

It is also desired that the authentication process does not reveal any secret information, e.g., the identity of the prover. This is known as zero knowledge authentication. A lucid and non-mathematical presentation of the concept of zero knowledge is provided by Quisquater et al., "How to explain zero knowledge protocols to your children," Advances in Cryptology—CRYPTO '89, LNCS 435, pp. 628-631, 1989.

With the zero knowledge authentication protocol, the prover convinces the verifier that the prover is in possession of knowledge of a secret, without revealing the secret itself. This is unlike a conventional password protocol, where the prover must reveal the secret to the verifier in order to authenticate.

It is very important to keep in mind that the authentication protocol provides assurances only at the instant in time when the protocol is successfully completed. It is therefore important to ensure that the authentication process is tied to some form of ongoing security service. At some level, all authentication protocols are vulnerable to the adversary who cuts in immediately after the successful authentication of the prover.

Zero knowledge protocols allow the prover to demonstrate knowledge of the secret while revealing no information whatsoever other than the fact the prover possesses the secret, Goldwasser et al., "The knowledge complexity of interactive proof-systems," Proceedings of the $17^{th}$ Annual ACM Symposium on Theory of Computing, pp. 291-304, 1985, and U.S. Pat. No. 4,995,082, "Method for identifying subscribers and for generating and verifying electronic signatures in a data exchange system," issued to Schnorr on Feb. 19, 1991.

An interactive protocol is said to be a proof of knowledge when there exists an algorithm that can always extract the secret. A protocol is said to be zero knowledge when it does not reveal the secret. As an advantage, the zero knowledge protocol does not suffer a degradation from repeated use and resists all attempts at impersonation.

A protocol is said to be honest-verifier zero knowledge if it is zero knowledge when interacting with honest verifiers. The honest-verifier zero knowledge protocol has a weaker security guarantee than the general zero knowledge protocol because it is possible that a dishonest verifier can extract the secret.

The ultimate measure of the worth of the authentication protocol lies in its security against impersonation attempts. A protocol that is secure against impersonation under concurrent attacks is considered to be "secure" even if it is only honest-verifier zero knowledge.

For a detailed and exhaustive discussions on authentication protocols including biometric techniques, see Davies et al., "Security for computer networks," Wiley, 1989, and Ford, "Computer communications security: principles, standard protocols and techniques," Prentice Hall, 1994. Password based schemes including the concept of salting are described by Morris et al., "Password security: a case history," Communications of the ACM, Vol. 22, pp. 594-597, 1979, also see Needham et al., "Using encryption for authentication in large networks of computers," Communications of the ACM, Vol. 21, pp. 993-999, 1978.

Feige et al. adapted the concepts of zero knowledge to the application of authentication and proofs of knowledge. Since then there has been a veritable explosion of research into various aspects of zero knowledge, see Schneier "Applied cryptography," Wiley, 1996.

Conventional zero knowledge protocols require the interchange of a substantially amount of data between the prover and the verifier. The processing of the protocol also takes substantial computer resources. Therefore, zero proof knowledge protocols have only been feasible on high-complexity systems with a substantial communications bandwidth and memory, and a relatively sophisticated microprocessor. Such systems are relatively expensive and complex to build, operate and maintain.

However, there are an increasing number of low-complexity, hand-held devices with severely limited resources. Many of these device use microcontrollers instead of microprocessors. For a microprocessor to be useful it must be attached to RAM, disks, keyboards, and other I/O peripherals. Operating systems and applications programs need to be installed. A microprocessor chip, by itself has no use.

Not so for a microcontroller, which can be used as is. It usually has on-chip memory and for mass-produced controller, software is factory installed. As an advantage, microcontrollers are cheap to produce and simple to operate. There is no maintenance, because their low price makes them essentially disposable.

Therefore, it is desired to provide a simple, low-bandwidth zero knowledge protocol, which can operate with microcontrollers.

SUMMARY OF THE INVENTION

The invention provides a generalization of Schnorr's zero knowledge authentication that is provably fast and secure. The invention permits the efficient batch verification of an ordered list of identities with various privilege classes. The invention use degree d polynomials to represent an the ordered list of d identities. The protocol is honest-verifier zero knowledge. In addition, the protocol is secure against impersonation under concurrent attacks.

In a low-complexity authentication device, a microcontroller operates an LED to both transmit and detect light providing an optical communications channel for carrying authentication information.

As an advantage, the device, unlike smart cards, does not require physical contact, so there is no wear. In addition, the device does not require an external power supply, subject to tampering, like a smart card.

Unlike RF systems, the optical device is directional and short-range, so that the authentication environment is controlled. Also, a single device used as a key can open multiple locks without the fear of unintentionally opening a wrong lock that happens to be nearby.

The visible nature of the LED allows for a natural user interface, i.e., the user can easily tell whether the LED is glowing or the battery is dead. In addition, the device can provide illumination, like a flashlight, while it is being used, providing additional physical security.

Although the preferred device uses optical communications, the protocol can also be used with any other computing device, including smart cards, hand-held devices, and microprocessors.

DETAILED DESCRIPTION OF THE PREFERRED EMBODIMENT

The invention uses a generalization of Schnorr's zero knowledge authentication protocol, see the Appendix. A naïve generalization of Schnorr's scheme would authenticate d secret keys or identities by composing d authentication rounds in series. The prover sends d commitments, and the verifier replies d challenges, one for each identity. That scheme has a communication and computation cost that is d times the cost of Schnorr's scheme.

In contrast, the authentication protocol according to the invention sends one commitment and the verifier replies one challenge for all identities, in parallel. The prover's reply is generalized from a degree one polynomial, according to Schnorr, to a degree d polynomial formed from d secret identities according to the invention.

Figure 1:
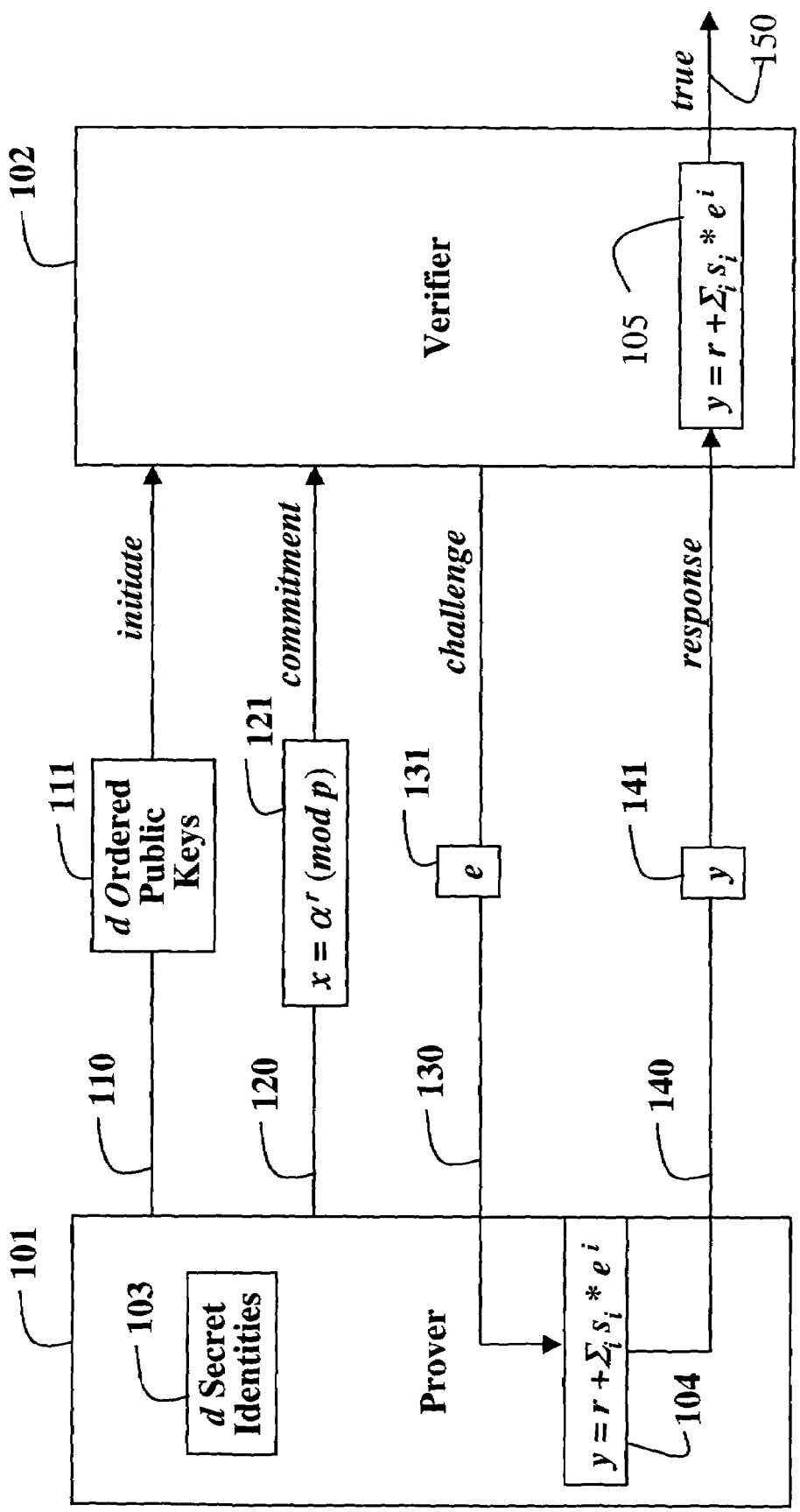
FIG. 1 is a diagram of a zero proof authentication protocol according to the invention.

FIG. 1 shows the basic steps of the authentication protocol according to the invention.

The parameters used by the protocol according to the invention are as follows. Two prime numbers p and q are such that q|p−1. A root of unity in $Z_p$ of order q is $\alpha$ such that $\alpha \neq 1$, i.e., $\alpha^q \equiv 1$ (mod p), or $\alpha$ is a generator of $G_q$. In other words, the values produced by $\alpha^q$(mod p) eventually produces all integer values in the range 1 to $G_q$. The numbers p, q and $\alpha$ are publicly known.

There are $d_i$ secret identities 103. Each identity $d_i$ consists of a private key $s_i$ and a public key $v_i$. A private key $s_i$ is a non-negative integer less than q, chosen uniformly at random. A public key is $v_i = \alpha^{-s_i}$ (mod p). Only the prover 101 knows the public keys.

Initiate

The prover 101 initiates 110 the protocol by sending an ordered list of the d public keys v, for which a prover claims to possess corresponding d private keys, to a verifier 102. It should be noted that the verifier can obtain the public keys 111 be other means. The net effect is that the verifier is in possession of the ordered d public keys.

Commitment by Prover

The prover selects a non-negative number r less than q uniformly at random. The prover sends 120 $x = \alpha^r$ (mod p) 121 to the verifier.

Challenge from Verifier

The verifier selects a non-negative number e less than $2^{(t+\log d)}$ uniformly at random. Here log is base 2. The number t is a security parameter, e.g. 95. The verifier sends 130 e 131 to the prover.

Response from Prover

The prover generates 104 $y = r + \Sigma_i s_i * e^i$ (mod q), for i=1, ..., d. The prover sends 140 y 141 to the verifier.

Verification

The verifier determines 105 if $x = \alpha^y * \Pi_i(v_i)^{e^i}$ (mod p) and accepts 150 the prover's claim if and only if the equality is true.

Completeness

It is clear that an honest prover can prove its identity to the verifier with a probability of one.

Soundness and Zero Knowledge

A fraudulent prover can cheat by guessing the correct challenge e ahead of time and sending the commitment $x = \alpha^{r'} * \Pi_i(v_i)^f$ (mod p), where f is one of the at most d roots of the equation $r + \Sigma_i s_i * f = r + \Sigma_i s_i * e^i$ (mod q). Here, the response is chosen to be y=r. However the probability of success for this attack is at most $2^{-t}$. This probability cannot be increased unless the discrete logarithm is easy to compute, which it is generally not the case.

The corresponding theorem of Schnorr is extended, as described below, to show that the invented protocol is a proof of knowledge. If there exists a fraudulent prover with non-negligible probability of success, then by repeatedly simulating this fraudulent prover it is possible to uncover multiple successful transcripts with the same commitment. These transcripts can then be used to compute all the d identities, thus demonstrating that the protocol is a proof of knowledge.

The basic idea of the proof is that if d+1 transcripts with the same commitment r are generated, then the discrete logarithm of each of the public keys can be determined by inverting the appropriate Van der Monde matrix, see Golub et al., "Matrix Computations," Johns Hopkins University Press, 1993.

The description of the proof uses the following notation. The fraudulent prover P' is any probabilistic Turing machine that has the values p, q and $\alpha$, as well as the d public keys $v_i$. A random string of P' is denoted by RP, an the success bit S(RP,e) is true (1) only if P' succeeds with RP, e, and false (0) otherwise.

The success rate S is an average over S(RP,e), where RP and e are chosen uniformly at random. Let T be the running time of P'. It is assumed that T is independent of RP and e because limiting the time to twice the average running time for successful pairs RP and e decreases the success rate by at most a factor of 2.

Theorem 1

If the success rate S of P' is greater than $2^{-t+1}$, then there exists a probabilistic Turing machine or process PL which, given black box access to P', computes the d private keys $s_i = \log_\alpha v_i$.

Proof

The process PL executes as follows.

In step 1, the process selects the string RP at random and simulates P' using a random probe e, say e1. If P' fails then it repeats step 1 with a new RP. Otherwise it goes to step 2.

In step 2, the process holds RP fixed and probes up to $(8u)(d+1)*\log(d+1)$ random e's in an attempt to find a total of d+1 e's, e1, e2 ... e(d+1) on which P' succeeds, where u is the number of passes of step 1. If the process fails in this attempt to find d+1 e's, then it goes back to step 1.

If successful in this attempt, then the process solves the d+1 equations of the form $y = r + \Sigma_i s_i * e^i$ to compute the d unknowns s1 through sd. The value r is the $(d+1)^{st}$ unknown. Solving these d+1 equations is equivalent to inverting the corresponding Van der Monde matrix.

To analyze the running time of PL, we need some additional definitions and two auxiliary results. Define S(RP) to be the fraction of e for which S(RP,e) is 1. Define RP to be "good" if S(RP) is at least S/2. Let #RP denote the size of the set of all RP and #e the size of the set of all e. Note that $\#e = 2^{(t+\log d)}$.

Lemma: With probability at least ½, PL picks a good RP in step 1.

Proof: The mean of S(RP), over all RP chosen uniformly at random, is S. Now $\Sigma_{RP} S(RP) = \#RP * S$. But because $\Sigma_{not\text{-}good\ RP} S(RP) < \#RP * S/2$ it follows that $\Sigma_{good\ RP} S(RP) \geq \#RP * S/2$. In other words, the set of RP,e, for which S(RP,e) is 1 and RP is good, is at least half the entire set for which S(RP,e) is 1. Hence, RP is good with a probability of at least ½.

Lemma:(Coupon collector lemma): With probability of at least ½, for a good RP, PL succeeds in finding a total of d+1 e's, e1, e2 ... e(d+1) on which P' succeeds, using up to $(4/S)(d+1)*\log(d+1)$ random probes.

Proof: Fix the good RP. Observe that because RP is good there must be greater than S/2 e's such that S(RP, e) is 1, i.e. there must be greater than $2^{-t} * 2^{(t+\log d)} = d$ successful e's. Let there be $k \geq S/2 * 2^{(t+\log d)} \geq d+1$ successful e's, i.e., the e's for which S(RP,e) is 1. Then, the expected number of probes to find d+1 distinct successful e's is $2^{(t+\log d)} (1/k + 1/(k-1) + \ldots + 1/(k-d))$. Because $k \geq S/2 * 2^{(t+\log d)}$ therefore the expected number of probes is at most $(2k/S)(1/k + 1/(k-1) + \ldots + 1/(k))$ which is at most $(2/S)(d+1)\ln(d+1)$. Hence with probability at least ½, PL will succeed using at most twice the expected number of probes.

The expected number of probes in step 1 is 1/S, and the expectation of u is 1/S, with probability at least ½, $U \geq (\frac{1}{2})(1/S)$. RP is good with probability ½. Hence, with a probability of at least ¼, both $u \geq (\frac{1}{2})(1/S)$ and RP are good, and PL succeeds in step 2 with a probability of at least ½. Because each probe takes O(T) steps, it follows that with probability at least ⅛, PL succeeds in O(d log d*T/S) steps.

Hence, the expected time is bounded by $((\frac{1}{8}) + (\frac{7}{8})(\frac{1}{8}) + (\frac{7}{8})(\frac{7}{8})(\frac{1}{8}) + \ldots) * O(d\log d * T/S) = O(d \log d * T/S)$ steps.

In the case of a honest verifier, it is possible to generate transcripts with the same distribution. Hence, the protocol is honest-verifier zero knowledge. But it is not zero knowledge in the general case because a dishonest verifier could choose a challenge that is dependent on the commitment making it difficult to generate transcripts with the same distribution. Informally, however, the reason no information is revealed is that the numbers x and y, the commitment and the response, are essentially random.

Security Against Impersonation under Concurrent Attack

The invented protocol is secure against impersonation under concurrent attacks. As stated above, the ultimate end goal of the authentication protocol is establishing security against impersonation.

In a concurrent attack, the adversarial prover is allowed to play the role of the cheating verifier and interact concurrently with multiple honest provers prior to the impersonation attempt.

The proof is based on the assumption that discrete exponentiation is secure under d more inversions in the underlying group. Informally, the assumption states that if the cheating adversary is given access to a discrete logarithm oracle, then it is computationally infeasible for the adversary to compute the discrete logarithm of all challenge points in a randomly chosen collection with strictly d fewer queries than challenge points to the discrete logarithm oracle.

If d is 1 and the collection of challenge points has size one, then this assumption is the usual one-wayness of the discrete exponentiation function. This assumption has the advantage of reducing the security of the authentication scheme to the hardness of a number theoretic problem. If d>1, then the assumption is implied by, and hence no stronger than, a corresponding assumption described by Bellare et al., "GQ and Schnorr identification schemes: proofs of security against impersonation under active and concurrent attacks," Advances in Cryptology—CRYPTO '02, 2002.

Before describing the proof of the theorem, the following notation is develop. Let DLPG denote the discrete logarithm parameter generator. This is a poly(k)-time randomized algorithm, given parameter k outputs the pair q and α, where q is prime such that q|p−1, and α is a generator of $G_q$; p is k bits long. The proof does not require a specific generator. The proof of the security of the protocol is based on an assumption about DLPG.

A dmdl adversary is a randomized polynomial-time algorithm that gets input q and α, and has access to two oracles—a challenge oracle that returns a random element in $G_q$ each time it is invoked, and a discrete logarithm oracle that, given an element Y in $G_q$, returns $\log_\alpha Y$. The game is to run DLPG and then to run the dmdl adversary on its output. The omdl adversary wins if it successfully finds the discrete logarithms of all the points generated by the challenge oracle while querying the discrete logarithm oracle on strictly d fewer points.

Let adv-dmdl(k) denote the success probability of the dmdl adversary. Let impca denote the adversary that first takes on the role of fraudulent verifier and interacts concurrently with several honest prover clones before subsequently taking on the role of fraudulent prover. Let adv-impca(k) denote the probability that impca is successful at impersonation.

Theorem 2

Given an adversary impca attacking the protocol associated with DLPG, there exists an dmdl adversary such that for every k $$Adv\text{-}impca(k) <= 2^{-t} + (adv\text{-}dmdl(k))^{1/(d+1)}$$

Proof

It is possible to construct a dmdl adversary that interacts with the impca adversary and uses the knowledge obtained to compute the discrete logarithm of d more challenge points than it obtains from the discrete logarithm oracle.

First, the dmdl adversary queries the challenge oracle d times and obtains d random group elements $v_i=\alpha^{-s_i}$. Then, the dmdl adversary runs the impca adversary in cheating verifier mode and corresponding to each prover returns commitments $x_i$ by querying the challenge oracle and responses $y_i$, corresponding to challenges $e_i$, by returning the response from the discrete logarithm oracle to the query $x_i * \Pi_j(v_i)(-e^j{}_i)$, j=1 to d.

Second, the dmdl adversary runs the impca adversary in cheating prover mode d+1 times. If any two challenges are the same, then the dmdl adversary fails. The commitment of the cheating prover stays the same, because it starts each time with the knowledge gained as cheating verifier. Any randomness can also be incorporated into this knowledge.

Let $x=\alpha^r$ be the commitment and let $w_i$ be the response corresponding to the distinct challenges $c_i$. If the cheating prover fails even once then, the dmdl adversary fails. If the cheating prover succeeds each of the d+1 times, then the dmdl adversary has d+1 equations of the form $w_i = r + \Sigma_j s_j * c_i^j$, with d+1 unknowns, r and the d $c_i$. By inverting the Van der Monde matrix formed from these equations, the equations can be solved to obtain the $s_i$. Then, the dmdl adversary returns $y_i - \Sigma_j s_j * e_j^i$ corresponding to the query $x_i$ made of the challenge oracle.

It is possible to verify that dmdl succeeds with strictly d fewer queries to the discrete logarithm oracle when the cheating impca prover succeeds d+1 times. The probabilities of the two events are now related. An auxiliary result is a generalization of an equivalent result obtained by Bellare et al.

Generalized Reset Lemma: Consider any prover, including potentially cheating provers. Let A and B be random variables over the space of the random coins, RP, of the prover. Let A denote the probability, taken over e, that the verifier accepts. Let B denote the probability, taken over e's, that when the verifier is reset and run d+1 times, a different e is generated each time and the verifier accepts each time. Let acc=E(A) and res=E(B). Then $acc \leq 2^{-t} + res^{1/d+1}$.

Proof: Let $1/c = 2^{t+\log d}$ be the size of the challenge set, i.e. #e. It is easy to see that $B \geq A(A-c)(A-2c) \ldots (A-dc)$. This implies that $B \geq (A-dc)^{(d+1)}$ which yields that $E(A) \leq dc + E(B)^{1/(d+1)}$ or $E(A) \leq 2^{-t} + E(B)^{1/d+1}$.

Now observe that adv–impca(k)=E(acc), where the expectation is taken over the choice of $v_i$ and the knowledge gained as the cheating verifier. Sirmilarly, $$\leq adv\text{-}dmdl(k) = E(res).$$

Applying the reset lemma, $$adv\text{-}impca(k) = E(acc)$$
$$\leq E(2^{-t} + (res)^{1/(d+1)})$$
$$1. = 2^{-t} + E((res)^{1/(d+1)})$$
$$\leq 2^{-t} + (E(res))^{1/(d+1)}, \text{ (by Jensen's inequality), and}$$
$$1. = 2^{-t} + (adv\text{-}dmdl)^{1/(d+1)}$$

The following corollary is a straightforward consequence of Theorem 2.

Corollary

If DLPG is such that adv–dmdl is negligible and if $t=\omega(\log k)$, then the protocol associated with DLPG is secure against concurrent attacks. The assumption that t is super-logarithmic in k is necessary for otherwise the scheme can be broken by guessing the verifier's challenge.

Authentication Using Multiple Identities

Authentication protocols form the building blocks of authorization and access control systems. A typical structure of an access control system includes an access control matrix of resources and associated identities. A successful authentication of an identity enables access to the associated resources.

There are two primary types of access control. In one type, the prover has a certificate that authorizes the prover access to a particular set of resources. In the other type, the verifier possesses information regarding allowed resources for a particular identity.

In practical applications, provers do not always possess the wherewithal to engage in certificate exchange, and verifiers are often stand-alone and hence need to be provided with a list of allowed identities and corresponding privileges.

In theory, one could generate a unique identity for each subset of resource and provide verifiers with the access control matrix corresponding to all possible identities. However, this is prohibitively expensive in terms of storage because there are $2^n$ possible resource subsets for n resources.

However, it is possible to take advantage of the fact that the present protocol can authenticate an ordered list of up to d identities in one round. Then, given a memory at the verifier that can support up to m identities, i.e., public/private key pairs, one can generate $1+m+m^2+\ldots m^d = (m^{d+1}-1)/(m-1)$ possible resource sets.

Thus, even if there is insufficient space for $2^n$ distinct identities, it is possible to achieve the same effect by selecting an appropriate d=O(n/log m), by trading off processing and memory.

Efficiency

For an ordered list of d identities, the authentication protocol according to the invention O(log d) has more bits than Schnorr's scheme for one identity. However, it requires d modular multiplications, whereas Schnorr's scheme makes do with only one modular multiplication.

Implementations

LEDs

Light emitting diodes (LEDs) are ubiquitous interfaces. Their diverse applications include numeric displays, flashlights, vehicle brake lights, traffic signals and the omnipresent equipment indicator.

Because LEDs are commonly used as light emitters, it is often forget that LEDs are fundamentally photodiodes, and hence can also operate as light detectors. Although LEDs are not optimized for light detection, LEDs can be very effective at detecting light.

The interchangeability between solid-state light emission and detection was described by Forrest W. Mims in "Sili-connections: Coming of age in the electronic era," McGraw Hill, 1986. and "LED circuits and projects," Sams and Co, 1993, but has since largely been forgotten.

An interface circuit for alternately emitting and detecting light using an LED is described by Dietz et al., in U.S. patent application Ser. No. 10/126,761 filed by Dietz et al. on Apr. 19, 2001, In addition to the LED and two digital I/O pins of a simple microcontroller, the circuit requires only a single current limiting resistor. When forward-biased, the LED emits light, and when reverse-biased, the LED it detects light.

The implications of LED-based data communication are significant, because it is essentially software that makes the microcontroller operate the LED in two different modes. With this technique any LED connected to a microprocessor can be made to operate as a bi-directional data port, although at a relatively low bandwidth. The micro-processor is similarly constrained in its processing capabilities.

Hardware

Figure 2:
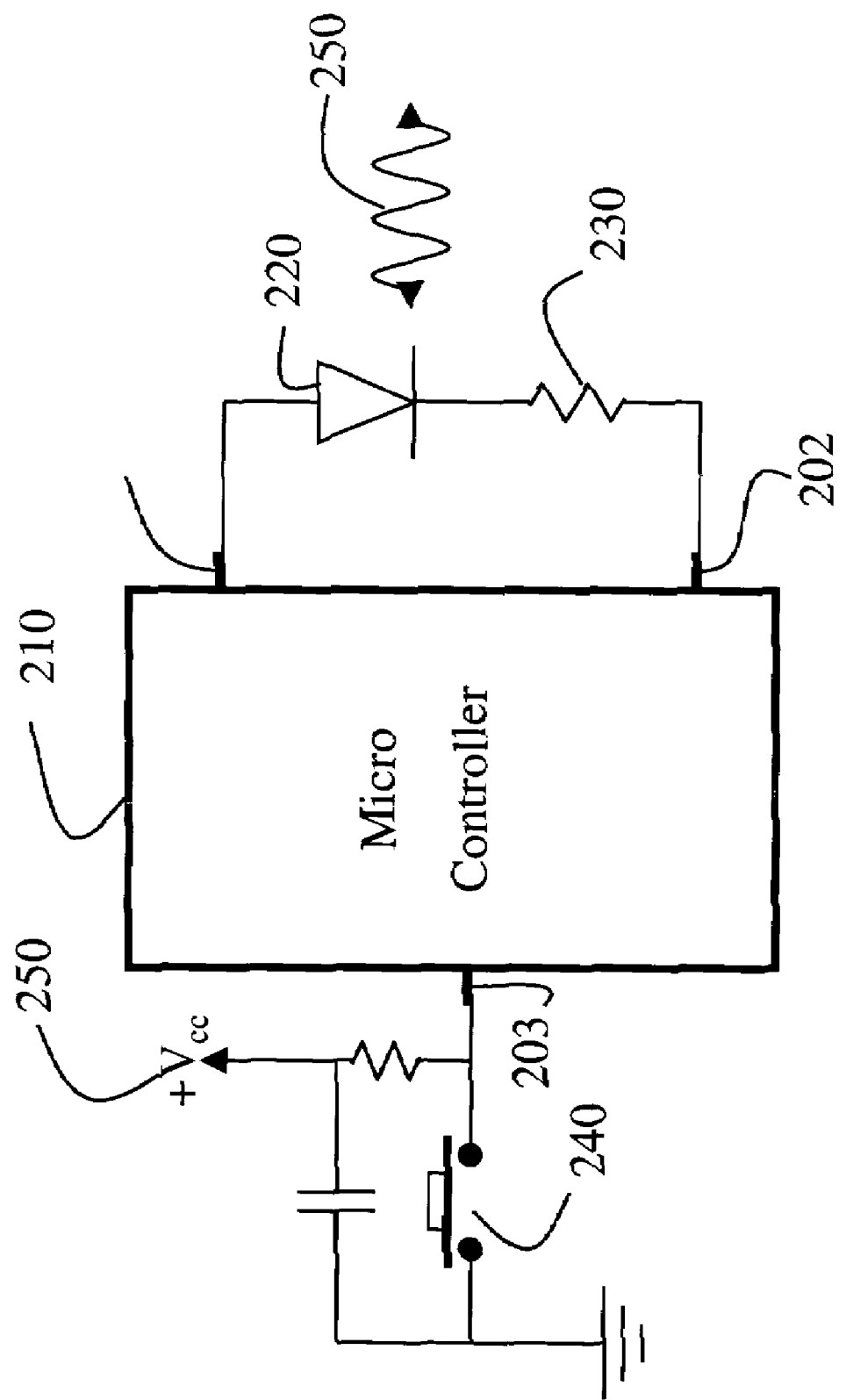
FIG. 2 is a schematic of a device that uses the protocol of FIG. 1.

The low-bandwidth zero knowledge authentication protocol can be implemented with a relatively simple device 200 as shown in FIG. 2.

The authentication device 200 includes a microcontroller 210, e.g., a Microchip PIC16LF628. A first I/O pin 201 of the microcontroller is connected to an input of an LED 220, and a second I/O pin 202 is connected to a resister 230 connected, in turn, to an output of the LED. A push button switch 240 connected to a third I/O pin 203 operates the device from a small a 3-volt lithium coin-cell battery 250. All other components shown operate conventionally. During operation, the device emits and senses light 250 as described by Dietz et al. to transmit and receive data corresponding to the authentication protocol described herein.

The PIC uses 8-bit instructions, runs at 5 MIPS, and has 16 KB of writeable memory. A mass produced version of the device 200 would cost no more than a LED keychain flashlight. In fact, the device according to the invention can also be used a flashlight.

Because the data rate of the device is relatively low, the low bandwidth authentication protocol is ideally suited for the device. The range of communication is several centimeters. The intent is that the prover operates the device. The verifier uses a similar device with, perhaps, a more powerful microcontroller or microprocessor.

In a typical application, the prover is a person that desires to gain access to a secure facility (house, bank) or equipment (ATM, car, computer) controlled by the verifier.

Security

The security parameter t, see above, is set to 95. This is generally considered adequate security, see Schnorr. The number of identities d is set to 32 so that t+log d=100.

The prime number q has at least 200 bits long because of the existence of an $O(q^{1/2})$ 'baby-step/giant-step' process for finding discrete logarithms, see Schnorr. In conjunction with the existence of a general number field sieve, the prime number p has about 1500 bits, see LaMacchia et al., "*Computation of discrete logarithms in prime fields,*" Designs, Codes and Cryptography, Vol. 1, pp. 46-62, 1991.

Prover

As an advantage, the protocol according to the invention can operate with a relatively small amount of memory. The small sized memory stores both the data, e.g., keys, parameter, and tables, and the software implemented protocol. This is common for small sized devices, as well as smart cards, which can also use the invention, With smart cards, the data are communicated electrically, instead of optically, requiring a physical interface.

The primary operation performed by the prover is modular multiplication. This multiplication can be implemented by the well known fast Fourier transform of Cooley and Tukey, which takes O(nlogn) bit operations, see Strang G., "Linear algebra and its applications," Harcourt Brace, 1988. However, that scheme has a relatively high complexity, even though it is asymptotically efficient.

Hence, the preferred embodiment uses a pre-computed table to substantially reduce the complexity of the procedure as well as computation time. For each private key v, the memory stores a pre-computed table of the residues modulo q of the product of the private key with the powers of 2 from $2^1$ to $2^{1+\log q}$.

To multiply the private key with any given number, the residues corresponding to the powers of 2 present in the binary representation of that number are added. The residue modulo q of $2^{1+\log q}$ enables one to reduce the overflow when doing addition, so that one always has a number with log q bits.

In response to receiving the challenge e 131 from the verifier, a similar table storing the residues modulo q of the product of e with the powers of 2 from $2^1$ to $2^{1+\log q}$ is constructed. This table is used to determine the powers of e, and the pre-computed tables of the private keys is used to compute $y=r+\Sigma_i s_i*e^i$ (mod q). This enhancement enables the device to complete the authentication in a matter of seconds or shorter depending on size of the various parameters.

Smart-Cards

The invention can also be used with wallet-sized smart cards. Smart-cards are usable for any number of applications. In the past, they are typically used to spend and receive electronic cash and credit. They can also be used to make telephone calls from payphones, sign documents, access bank accounts or gain entry to buildings. They are typically tamper-proof, see Guillou et al., "The smart card: a standardized security device dedicated to public cryptography," Contemporary Cryptology: The Science of Information Integrity, IEEE, pp. 561-613, 1992.

Smart cards typically consist of a single microcontroller that includes a memory (RAM and PROM) to store the necessary parameters for the execution of public key schemes. Many smart cards systems employ magnetic stripes and card readers for communication. Smart cards typically rely on external power sources, e.g. from the card reader. This makes it harder to render smart cards tamper-proof against hostile environments with compromised power supplies. These microcontroller can be programmed to implement to protocol according to the invention.

Effect of the Invention

The invention provides a low-complexity zero knowledge authentication protocol that can be used with low-complexity portable device, such as hand-held optical transceivers, and smart cards. The protocol is secure against impersonation under active and concurrent attacks. The invented protocol is honest-verifier zero knowledge, and can be extended to a general zero knowledge protocol.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

Appendix

Schnorr's Authentication Scheme

Protocol

Schnorr's authentication scheme is based on the hardness of discrete log. Two prime numbers p and q are such that q|p−1. A root of unity in $Z_p$ of order q is α such that $\alpha \neq 1$, i.e., $\alpha^q \equiv 1$ (mod p). The prime numbers p, q and α are publicly known.

A secret key or identity consists of a private key s and a public key v. The private key s is a non-negative integer less than q, chosen uniformly at random. The public key is $v=\alpha^{-s}$ (mod p).

As with most zero knowledge authentication schemes, the core of the Schnorr protocol has the following main steps.

Initiation

The Prover initiates the protocol by sending the public key for which the prover claims to possess the corresponding private key.

Commitment by Prover.

The prover picks a non-negative number r less than q uniformly at random. The prover sends $x=\alpha^r$ (mod p) to the verifier.

Challenge from Verifier.

The verifier picks a non-negative number e less than $2^t$, chosen uniformly at random. The number t is a security parameter that characterizes the soundness of the protocol. The verifier sends e to the prover.

Response from Prover.

The prover computes $y=r+s*e$ (mod q). The prover sends y to the verifier. The verifier checks that $x=\alpha^y*v^e$ (mod p) and accepts the prover's claim if and only if the equality is true.

Completeness.

It is clear that an honest verifier can engage in this protocol and prove its identity to the verifier with probability 1.

Soundness.

A fraudulent prover can cheat by guessing the correct challenge e ahead of time and sending the commitment $x=\alpha^r*v^e$ (mod p) where the response is chosen to be $y=r$. However the probability of success for this attack is $2^{-t}$. The success rate cannot be increased unless the discrete logarithm is easy to computed.

Zero Knowledge.

This protocol is a proof of knowledge because two transcripts with the same commitment r can be generated, and is easy to compute the discrete logarithm ($\log_\alpha v=(y-y')/(e-e')$ (mod q)). If there exists a fraudulent prover with non-negligible probability of success, then by repeatedly simulating this fraudulent prover it is possible to uncover two transcripts with the same commitment thus demonstrating that the protocol is a proof of knowledge.

Clearly, in the case of the honest verifier, it is possible to generate transcripts with the same distribution and hence the protocol is honest verifier zero knowledge. However, this protocol is not zero knowledge in the general case because a dishonest verifier could choose a challenge that is dependent on the commitment. This makes it difficult to generate transcripts with the same distribution. However, informally, the reason no information is revealed is that the numbers x and y are essentially random.

We claim:

1. A method for authenticating $d_i$ identities using two prime numbers p and q such that q|p−1, each identity includes a private key $s_i$ and a public key $v_i$, and a publicly known generator is $\alpha$ such that $\alpha^q \equiv 1$ (mod p), comprising:

providing, a verifier, with an ordered list of the public keys $v_i$;

selecting uniformly at random, by a prover, a non-negative number r less than q;

sending a number $x=\alpha^r$ (mod p) from the prover to a verifier;

selecting uniformly at random, by the verifier, a non-negative number e less than $2^{(t+\log d)}$, where log is base 2, and a number t is a predetermined security parameter;

receiving by the prover from the verifier the number e;

generating, by the prover, a number $y=r+\Sigma_i\, s_i*e^i$ (mod q);

sending by the prover to the verifier the number y;

determining if an equality $x=\alpha^y*\Pi_i(v_i)^{e^i}$ (mod p) is true; and accepting the prover as having the $d_i$ identities if and only if the equality is true.

2. The method of claim 1, in which the security parameter is 95.

3. The method of claim 1, in which the sending and receiving by the prover is performed by a single LED of an optical communications device.

4. The method of claim 3, further comprising:

driving the LED in forward bias to emit light; and driving the LED in reverse bias to sense light.

5. The method of claim 1, in which the LED is coupled to pins of a microcontroller via a current limiting resister, and the microcontroller is operated by a switch.

6. The method of claim 3, in which the LED operates as a flashlight while authenticating.

7. The method of claim 1, in which the sending and receiving by the prover is performed by a microcontroller of a smart card.

8. The method of claim 1, in which the generating uses a fast Fourier transform.

9. The method of claim 1, further comprising:

storing, in a memory accessible by the prover, a table, for each private key $v_i$, a residue modulo q of a product of the private key $v_i$ with numbers n expressed as powers of 2 from $2^1$ to $2^{1+\log q}$; and multiplying a particular private key with a particular number n by adding the corresponding residue to the private key.

10. The method of claim 1, further comprising:

storing in a memory accessible by the prover, for each residue modulo q of a product of e with powers of 2 from $2^1$ to $2^{1+\log q}$.

* * * * *